US012469450B2

(12) United States Patent
Pu et al.

(10) Patent No.: US 12,469,450 B2
(45) Date of Patent: Nov. 11, 2025

(54) DISPLAY DRIVING CIRCUIT, DISPLAY DRIVING METHOD AND DISPLAY PANEL

(71) Applicant: HKC CORPORATION LIMITED, Shenzhen (CN)

(72) Inventors: Yang Pu, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/666,351

(22) Filed: May 16, 2024

(65) Prior Publication Data

US 2024/0404468 A1 Dec. 5, 2024

(30) Foreign Application Priority Data

May 31, 2023 (CN) ......................... 202310645357.4

(51) Int. Cl.
*G09G 3/3233* (2016.01)

(52) U.S. Cl.
CPC ... *G09G 3/3233* (2013.01); *G09G 2300/0852* (2013.01); *G09G 2310/08* (2013.01); *G09G 2330/021* (2013.01)

(58) Field of Classification Search
CPC ......... G09G 3/3233; G09G 2300/0852; G09G 2310/08; G09G 2330/021
See application file for complete search history.

(56) References Cited

U.S. PATENT DOCUMENTS

| | | | | |
|---|---|---|---|---|
| 11,935,456 B2 * | 3/2024 | Kim | ..................... | G09G 3/2014 |
| 2004/0263503 A1 * | 12/2004 | Seki | ..................... | G09G 3/3233 345/204 |

(Continued)

FOREIGN PATENT DOCUMENTS

| | | |
|---|---|---|
| CN | 1874627 | 12/2006 |
| CN | 102222468 | 10/2011 |

(Continued)

OTHER PUBLICATIONS

CNIPA, First Office Action for CN Application No. 202310645357.4, Mar. 1, 2024.

(Continued)

*Primary Examiner* — Jeff Piziali
(74) *Attorney, Agent, or Firm* — Hodgson Russ LLP

(57) ABSTRACT

A display driving circuit includes a first transistor, a storage subcircuit, a compensation subcircuit, a data writing subcircuit, a light-emitting control subcircuit and a reverse bias subcircuit. The storage subcircuit is connected to a control terminal of the first transistor through a first node and to the first transistor through a second node. The compensation subcircuit is connected to a first light-emitting control line, the first transistor and a power supply high-voltage terminal. The data writing subcircuit is connected to a data line, a scan line and the first node. The light-emitting control subcircuit is connected to a second light-emitting control line, a second node and an anode of the display light-emitting subcircuit, a cathode of the display light-emitting subcircuit is connected to the scan line. The reverse bias subcircuit is connected to the scan line, a third node and the power supply high-voltage terminal.

13 Claims, 4 Drawing Sheets

(56) References Cited

U.S. PATENT DOCUMENTS

| | | | | |
|---|---|---|---|---|
| 2006/0244695 | A1* | 11/2006 | Komiya | G09G 3/006 345/76 |
| 2013/0043802 | A1* | 2/2013 | Han | G09G 3/3233 315/240 |
| 2015/0154906 | A1* | 6/2015 | Chung | G09G 3/3233 345/212 |
| 2022/0310017 | A1* | 9/2022 | Yang | G09G 3/3241 |
| 2023/0036497 | A1* | 2/2023 | Kim | G09G 3/32 |
| 2024/0046870 | A1* | 2/2024 | Chung | G09G 3/3233 |
| 2024/0096276 | A1* | 3/2024 | Byun | G09G 3/32 |
| 2024/0265869 | A1* | 8/2024 | Byun | G09G 3/3275 |

FOREIGN PATENT DOCUMENTS

| | | |
|---|---|---|
| CN | 104217674 | 12/2014 |
| CN | 106940979 | 7/2017 |
| CN | 108376534 | 8/2018 |
| CN | 109686313 | 4/2019 |
| CN | 110520922 | 11/2019 |
| CN | 111161674 | 5/2020 |
| CN | 111210771 | 5/2020 |
| CN | 112352274 | 2/2021 |
| CN | 113112959 | 7/2021 |
| CN | 113257194 | 8/2021 |

OTHER PUBLICATIONS

CNIPA, Notification to Grant Patent Right for Invention for CN Application No. 202310645357.4, Mar. 19, 2024.

* cited by examiner

DISPLAY DRIVING CIRCUIT, DISPLAY DRIVING METHOD AND DISPLAY PANEL

CROSS-REFERENCE TO RELATED APPLICATIONS

This application claims priority to Chinese Patent Application No. 2023106453574, filed May 31, 2023, the entire disclosure of which is incorporated herein by reference.

TECHNICAL FIELD

The present application relates to the display field, and more particularly, to a display driving circuit, a display driving method and a display panel.

BACKGROUND

OLED (Organic Light-Emitting Diode) display panels have the advantages of being self-luminous, bendable, thin, high brightness, low power consumption, fast response and wide colour gamut, and are widely used in electronic products such as TVs, mobile phones and notebooks.

At present, the driving mode of organic light-emitting diodes is mostly DC driving. With the increase of luminescence time, the luminous efficiency will decrease. If AC driving is adopted, the capacitance effect of OLED can not be ignored. As AC signal of the OLED cathode changes, the signal of the OLED anode will also change, in order to reduce the change of anode voltage, it is necessary to couple a relatively large capacitor in the anode and configure a complex compensation circuit. Large capacitance and complex compensation circuit will occupy a large amount of space in the display area, which will reduce the available display area (panel aperture ratio) and increase the power consumption.

SUMMARY

There are provide a display driving circuit, a display driving method and a display panel according to embodiments of the present disclosure. The technical solution is as below:

According to a first aspect of embodiments, there is provided a display driving circuit, which includes a first transistor, the first transistor being connected to a display light-emitting subcircuit, and the display driving circuit further includes:

- a storage subcircuit connected to a control terminal of the first transistor through a first node and connected to a first terminal of the first transistor through a second node;
- a compensation subcircuit connected to a first light-emitting control line, a second terminal of the first transistor and a power supply high-voltage terminal;
- a data writing subcircuit connected to a data line, a scan line and the first node, for writing a data line signal into the storage subcircuit in response to a scan line signal;
- a light-emitting control subcircuit connected to a second light-emitting control line and the second node, the light-emitting control subcircuit further connected to an anode of the display light-emitting subcircuit through a third node, a cathode of the display light-emitting subcircuit being connected to the scan line; and
- a reverse bias subcircuit connected to the scan line, the third node and the power supply high-voltage terminal, for enabling potentials of the cathode and anode of the display light-emitting subcircuit to be equal or enabling potentials of the cathode and anode of the display light-emitting subcircuit to be reversed in response to the scan line signal.

According to a second aspect of embodiments of the present disclosure, there is a display driving method, the display driving method is used for driving the display driving circuit. The display driving method includes:

- in a first stage, controlling the scan line and the first light-emitting control line to output a high-level signal, and controlling the second light-emitting control line to output a low-level signal, writing a threshold voltage of the first transistor into the storage subcircuit, and enabling potentials of the cathode and anode of the display light-emitting subcircuit to be equal or enabling potentials of the cathode and anode of the display light-emitting subcircuit to be reversed;
- in a second stage, controlling the scan line to output the high-level signal, controlling the first light-emitting control line and the second light-emitting control line to output the low-level signal, and controlling the data line to output a data signal, writing the data signal into the storage subcircuit; and
- in a third stage, controlling the scan line to output the low-level signal, and controlling the first light-emitting control line and the second light-emitting control line to output the high-level signal, turning on the power supply high-voltage terminal, the compensation subcircuit, the first transistor, the light-emitting control subcircuit, the display light-emitting subcircuit and the scan line sequentially.

According to a third aspect of embodiments of the present disclosure, there is a display panel, including:

- a display driving circuit; and
- a display light-emitting subcircuit connected to a light-emitting control subcircuit of the display driving circuit.

It should be understood that the above general description and the following detailed description are exemplary and explanatory only and are not intended to limit the present disclosure.

BRIEF DESCRIPTION OF DRAWINGS

The accompanying drawings, which are incorporated in and constitute a part of the description, illustrate embodiments consistent with the present application and, together with the description, serve to explain the principles of the present application. It will be apparent that the drawings described below are only some embodiments of the present application, and other drawings may be obtained from them without creative effort for those of ordinary skill in the art.

DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of exemplary embodiments will be fully communicated to those skilled in the art.

Further, the described features, structures or characteristics may be incorporated in any suitable manner in one or more embodiments. In the following description many specific details are provided to give a full understanding of the embodiments of the present application. However, those skilled in the art will appreciate that the technical aspects of the present application may be practiced without one or more of the specific details, or other methods, components, devices, steps and the like may be employed. In other instances, the common methods, devices, implementations or operations are not shown or described in detail to avoid obscuring aspects of the present application.

The present application is described in further detail below in conjunction with the accompanying drawings and specific embodiments. It should be noted that the technical features involved in the different embodiments of the present application described below can be combined mutually in case of no conflict. The following embodiments described with reference to the drawings are illustrative and only used to explain the present application, but may not be interpreted as the restrictions of the present application.

Embodiment I

Figure 1:
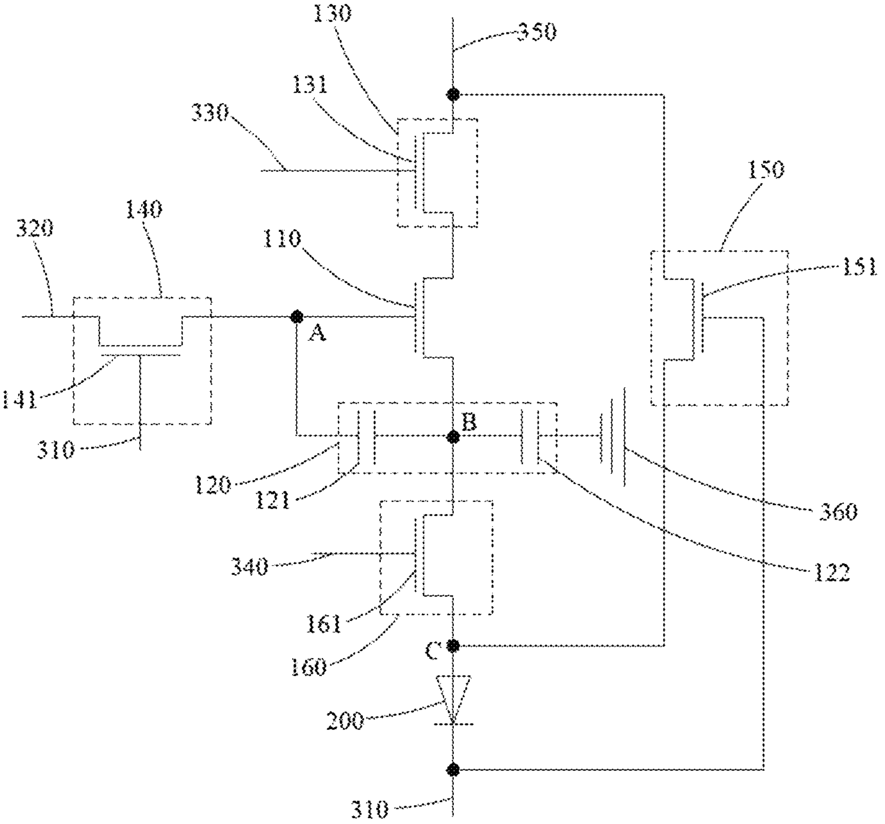
FIG. 1 is a schematic diagram of a display driving circuit in embodiment I of the present application.
Figure 2:
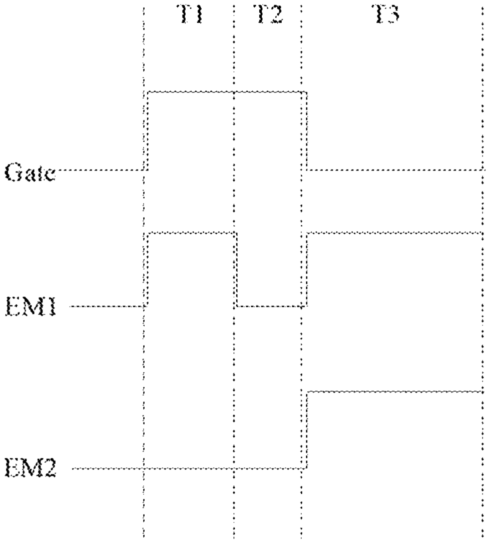
FIG. 2 is a control sequence diagram of the display driving circuit in embodiment I of the present application.

FIG. 1 is a schematic diagram of a display driving circuit in embodiment I of the present application. FIG. 2 is a control sequence diagram of the display driving circuit in embodiment I of the present application. Referring to FIGS. 1 and 2, the display driving circuit in this embodiment includes a first transistor 110, a storage subcircuit 120, a compensation subcircuit 130, a data writing subcircuit 140, a reverse bias subcircuit 150 and a light-emitting control subcircuit 160.

The first transistor 110 is a driving transistor, and the first transistor 110 is configured with a control terminal, a first terminal and a second terminal. The first terminal of the first transistor 110 is indirectly connected to an anode of the display light-emitting subcircuit 200. The display light-emitting subcircuit 200 may include an organic light-emitting diode. The first transistor 110 may be an N-type transistor, and the control terminal, the first terminal and the second terminal of the first transistor 110 may be a gate, a source and a drain thereof, respectively.

The storage subcircuit 120 is connected to a control terminal of the first transistor 110 through a first node A, and the storage subcircuit 120 is connected to a first terminal of the first transistor 110 through a second node B. The storage subcircuit 120 is used for storing a threshold voltage Vth of the first transistor 110 and a data voltage Vdata. The compensation subcircuit 130 is connected to a first light-emitting control line 330 (outputting a first light-emitting control signal EM1), a second terminal of the first transistor 110 and a power supply high-voltage terminal 350. A voltage of the power supply high-voltage terminal 350 is Vdd. The main function of the compensation subcircuit 130 is to write the threshold voltage Vth to the storage subcircuit 120, thereby compensating the threshold voltage difference of different driving transistors and eliminating the display unevenness caused by the threshold voltage difference.

The data writing subcircuit 140 is connected to the data line 320, the scan line 310, and the first node A, and is configured for writing a signal of the data line 320 to the storage subcircuit 120 in response to a signal of the scan line 310 (i.e., a scan signal Gate). A light-emitting control subcircuit 160 is connected to a second light-emitting control line 340 (outputting a second light-emitting control signal EM2) and a second node B, and the light-emitting control subcircuit 160 is also connected to an anode of the display light-emitting subcircuit 200 through a third node C, and a cathode of the display light-emitting subcircuit 200 is connected to the scan line 310.

The reverse bias subcircuit 150 is connected to the scan line 310, the third node C, and the power supply high-voltage terminal 350, and is used for enabling potentials of the cathode and anode of the display light-emitting subcircuit 200 to be equal or enabling potentials of the cathode and anode of the display light-emitting subcircuit 200 to be reversed in response to the signal of the scan line 310.

When the display light-emitting subcircuit 200 is driven by a direct current, the luminescent material of the display light-emitting subcircuit 200 is always subjected to a forward biased voltage, and the defects in the luminescent material will trap space charges. With the increase of luminescent time, a built-in electric field will be formed in the luminescent material due to the accumulation of space charges, and the luminescent efficiency of the display light-emitting subcircuit 200 will be reduced.

In this embodiment, the first terminal of the first transistor 110 is connected to the anode of the display light-emitting subcircuit 200, the storage subcircuit 120 is connected to the control terminal of the first transistor 110 through the first node A, the storage subcircuit 120 is connected to the first terminal of the first transistor 110 through the second node B, the compensation subcircuit 130 is connected to the first light-emitting control line 330, the second terminal of the first transistor 110 and the power supply high-voltage terminal 350, the data writing subcircuit 140 is connected to the data line 320, the scan line 310 and the first node A, the light-emitting control subcircuit 160 is connected to the second light-emitting control line 340 and the second node B, and the light-emitting control subcircuit 160 is further connected to the anode of the display light-emitting subcircuit 200 through the third node C, a cathode of the display light-emitting subcircuit 200 is connected to the scan line 310, and the reverse bias subcircuit 150 is connected to the scan line 310, the third node C and the power supply high-voltage terminal 350.

When the signal of the scan line 310 is at the low level VgL, the scan line 310 serves as a power supply low-voltage terminal, and the current flows from the power supply high-voltage terminal 350, passing through the compensation subcircuit 130, the first transistor 110, the light-emitting control subcircuit 160, and the display light-emitting subcircuit 200, to the scan line 310 to drive the display light-emitting subcircuit 200 to emit light. The anode potential of the display light-emitting subcircuit 200 is greater than the cathode potential of the display light-emitting subcircuit 200, and the display light-emitting subcircuit 200 is in a forward biased state. When the signal of the scan line 310 is at a high level VgH, the cathode potential of the display light-emitting subcircuit 200 changes to the high potential VgH, and the anode potential of the display light-emitting subcircuit 200 is raised according to the charge conservation principle. The reverse bias subcircuit 150 turns on the power supply high-voltage terminal 350 and the anode of the display light-emitting subcircuit 200 in response to the signal of the scan line 310, and the anode potential of the display light-emitting subcircuit 200 changes to a potential Vdd of the power supply high-voltage terminal 350. The potential Vdd of the power supply high-voltage terminal 350 is less than or equal to the high potential VgH of the signal of the scan line 310, to enable the potentials of the cathode and anode of the display light-emitting subcircuit 200 to be equal or enable the potentials of the cathode and anode of the display light-emitting subcircuit 200 to be reversed, that is, the built-in electric field formed by the forward bias of the display light-emitting subcircuit 200 is eliminated, and the luminous efficiency of the display light-emitting subcircuit 200 is improved. By using the scan line 310 as the power supply low-voltage terminal, the number of signals required is reduced, thereby reducing the space occupied by signal traces.

By turning on the power supply high-voltage terminal 350 and the anode of the display light-emitting subcircuit 200, the anode potential of the display light-emitting subcircuit 200 changes into the potential Vdd of the power supply high-voltage terminal 350. Compared with the solution of coupling a larger capacitor at the anode and configuring a complex compensation circuit, this embodiment reduces the space occupied by the display driving circuit in the display area, improves the aperture ratio of the display panel, and reduces the power consumption of the display panel.

In addition, since the threshold voltage Vth of different driving transistors is different, the current and luminance of different display light-emitting subcircuits 200 are also different, which causes display unevenness of the display panel. According to this embodiment, the difference in threshold voltages of different driving transistors is compensated by providing a compensation subcircuit 130 to write the threshold voltage Vth into the storage subcircuit 120 before data is written into the storage subcircuit 120, thereby eliminating the display unevenness caused by the difference in threshold voltages.

Referring to FIG. 1, the high potential VgH of the signal of the scan line 310 is greater than the high potential Vdd of the power supply high-voltage terminal 350. For example, the high potential VgH of the signal of the scan line 310 is about 10V, the low potential VgL of the signal of the scan line 310 is about −6V, and the high potential Vdd of the power supply high-voltage terminal 350 is about 6V. The above potentials are all defined in relative to potential of the grounding terminal 360, and the potential of the grounding terminal 360 is 0. The reverse bias subcircuit 150 is configured to turn on the power supply high-voltage terminal 350 and the anode of the display light-emitting subcircuit 200 in response to the signal of the scan line 310, so that the anode potential of the display light-emitting subcircuit 200 changes to the potential Vdd of the power supply high-voltage terminal 350, to enable the potentials of the cathode and anode of the display light-emitting subcircuit 200 to be reversed, that is, the anode potential of the display light-emitting subcircuit 200 being greater than the cathode potential of the display light-emitting subcircuit 200 changes to the anode potential of the display light-emitting subcircuit 200 being less than the cathode potential of the display light-emitting subcircuit 200, that is, the reverse bias of the display light-emitting subcircuit 200 is achieved.

The high potential VgH of the signal of the scan line 310 is greater than the high potential Vdd of the power supply high-voltage terminal 350. When the reverse bias subcircuit 150 turns on the power supply high-voltage terminal 350 and the anodes of the display light-emitting subcircuit 200 to change the anode potential of the display light-emitting subcircuit 200 to the potential Vdd of the power supply high-voltage terminal 350, the display light-emitting subcircuit 200 can be reversely biased to more thoroughly eliminate the built-in electric field formed by the forward bias of the display light-emitting subcircuit 200 and further improve the luminous efficiency of the display light-emitting subcircuit 200.

For example, as shown in FIG. 1, the reverse bias subcircuit 150 includes a fourth transistor 151, and the fourth transistor 151 is configured with a control terminal, a first terminal and a second terminal. The control terminal of the fourth transistor 151 is connected to a scan line 310, the first terminal of the fourth transistor 151 is connected to the third node C, and the second terminal of the fourth transistor 151 is connected to the power supply high-voltage terminal 350. The fourth transistor 151 may be an N-type transistor, and the control terminal, the first terminal and the second terminal of the fourth transistor 151 may be a gate, a source and a drain thereof, respectively.

The fourth transistor 151 is controlled by the scan line 310. When the signal of the scan line 310 is a high-level signal, the fourth transistor 151 turns on the power supply high-voltage terminal 350 and the anode of the display light-emitting subcircuit 200, and changes the anode potential of the display light-emitting subcircuit 200 to the potential Vdd of the power supply high-voltage terminal 350, thereby achieving reverse bias of the display light-emitting subcircuit 200.

Referring to FIG. 1, the compensation subcircuit 130 includes a second transistor 131, and the second transistor 131 is configured with a control terminal, a first terminal and a second terminal. The control terminal of the second transistor 131 is connected to the first light-emitting control line 330, the first terminal of the second transistor 131 is connected to the second terminal of the first transistor 110, and the second terminal of the second transistor 131 is connected to the power supply high-voltage terminal 350. The second transistor 131 may be an N-type transistor, and the control terminal, the first terminal and the second terminal of the second transistor 131 may be a gate, a source and a drain thereof, respectively.

When the display driving circuit is operated, a potential $V_A$ of the first node A is 0 before the data voltage Vdata is written, and the first transistor 110 is not completely turned off. The voltage Vdd of the power supply high-voltage terminal 350 may be reduced to 0, thereby discharging through the power supply high-voltage terminal 350. When a source-drain voltage difference of the first transistor 110 is Vgs, where Vgs=VA−VB, and the potential $V_B$ of the second node B is equal to −Vth, Vgs=Vth, that is, when the second node B is discharged to −Vth, the first transistor 110 is completely turned off, and the threshold voltage Vth of the first transistor 110 is written into the storage subcircuit 120.

The compensation subcircuit 130 connects the power supply high-voltage terminal 350 and the second terminal of the first transistor 110, and the threshold voltage Vth is written into the storage subcircuit 120 before data is written into the storage subcircuit 120, thereby compensating the threshold voltage difference of different driving transistors and eliminating the display unevenness caused by the threshold voltage difference.

Referring to FIG. 1, the data writing subcircuit 140 includes a third transistor 141, the third transistor 141 is configured with a control terminal, a first terminal and a second terminal. The control terminal of the third transistor 141 is connected to the scan line 310, the first terminal of the third transistor 141 is connected to the first node A, and the second terminal of the third transistor 141 is connected to the data line 320. The third transistor 141 may be an N-type transistor, and the control terminal, the first terminal and the second terminal of the third transistor 141 may be a gate, a source and a drain thereof, respectively.

When the display driving circuit operates, after the threshold voltage Vth of the first transistor 110 is written into the storage subcircuit 120, the scan line 310 controls the third transistor 141 to be turned on, the third transistor 141 turns on the data line 320 and the first node A, and writes the data voltage Vdata into the first node A, that is, into the storage subcircuit 120. When the display light-emitting subcircuit 200 emits light, the driving current of the display light-emitting subcircuit 200 is not affected by the threshold voltage Vth of the first transistor 110.

The data writing subcircuit 140 includes the third transistor 141, and the third transistor 141 controls the data voltage Vdata to be written to the first node A in response to the scan signal, which features in a simple structure.

Referring to FIG. 1, the light-emitting control subcircuit 160 includes a fifth transistor 161, and the fifth transistor 161 is configured with a control terminal, a first terminal and a second terminal. The control terminal of the fifth transistor 161 is connected to the second light-emitting control line 340, the first terminal of the fifth transistor 161 is connected to the third node C, and the second terminal of the fifth transistor 161 is connected to the second node B. The fifth transistor 161 may be an N-type transistor, and the control terminal, the first terminal and the second terminal of the fifth transistor 161 may be a gate, a source and a drain thereof, respectively.

The light-emitting control subcircuit 160 includes the fifth transistor 161, and the fifth transistor 161 controls the second node B and the third node C to be turned on in response to a signal of the second light-emitting control line 340, and the current flows from the power supply high-voltage terminal 350, passing through the compensation subcircuit 130, the first transistor 110, the light-emitting control subcircuit 160, and the display light-emitting subcircuit 200, to the scan line 310 to drive the display light-emitting subcircuit 200 to emit light, which features in a simple structure of controlling the display light-emitting subcircuit 200.

It should be noted that the first transistor 110, the second transistor 131, the third transistor 141, the fourth transistor 151, and the fifth transistor 161 may be N-type transistors, but are not limited thereto, and one or more of the first transistor 110, the second transistor 131, the third transistor 141, the fourth transistor 151, and the fifth transistor 161 may also be P-type transistors, as the case may be.

Referring to FIG. 1, the storage subcircuit 120 includes a first capacitor 121, and the first capacitor 121 is connected to the first node A and the second node B.

The storage subcircuit 120 includes a first capacitor 121, the data voltage Vdata can be maintained through the first capacitor 121 so that the display light-emitting subcircuit 200 can stably emit light.

Referring to FIG. 1, the storage subcircuit 120 further includes a second capacitor 122, and the second capacitor 122 is connected to the second node B and the grounding terminal 360.

When the display driving circuit operates, the second node B potential is −Vth by compensation of the compensation subcircuit 130. When the data voltage Vdata is written to the first node A, the potential VA of the first node A changes from 0 to Vdata, and according to the capacitive coupling effect, the potential VB of the second node B changes from −Vth to (Cs/(Cs+Cd))*Vdata−Vth, where Cs is a capacitance of the first capacitor 121, and Cd is the capacitance of the second capacitor 122.

When the display light-emitting subcircuit 200 emits light, the current I flowing through the display light-emitting subcircuit 200 is:

$$I = 1/2 * \mu * k(Vgs - Vth)^2$$

Where Vgs is a potential difference between the gate and source of the first transistor 110, i.e., Vgs=VA−VB. Therefore, the current I flowing through the display light-emitting subcircuit 200 is:

$$I = 1/2 * \mu * k(\mathrm{VA} - VB - Vth)^2$$

$$I = 1/2 * \mu * k\big(Vdata - \big(Cs/(Cs + Cd)\big) * Vdata - Vth\big) - Vth\big)^2$$

$$I = 1/2 * \mu * k\big(Cd/(Cs + Cd)\big) * Vdata\big)^2$$

Where μ is a carrier mobility, k=W/L, W is a channel width of the first transistor 110, and L is a channel length of the first transistor 110.

Thus, the current I flowing through the display light-emitting subcircuit 200 is not affected by the threshold voltage Vth and the voltage Vdd of the power supply high-voltage terminal 350. That is to say, by compensating the threshold voltage, the present application eliminates the influence of the threshold voltage Vth and the voltage Vdd of the power supply high-voltage terminal 350 on the driving circuit, and improves the display unevenness of the display panel.

Embodiment II

Figure 3:
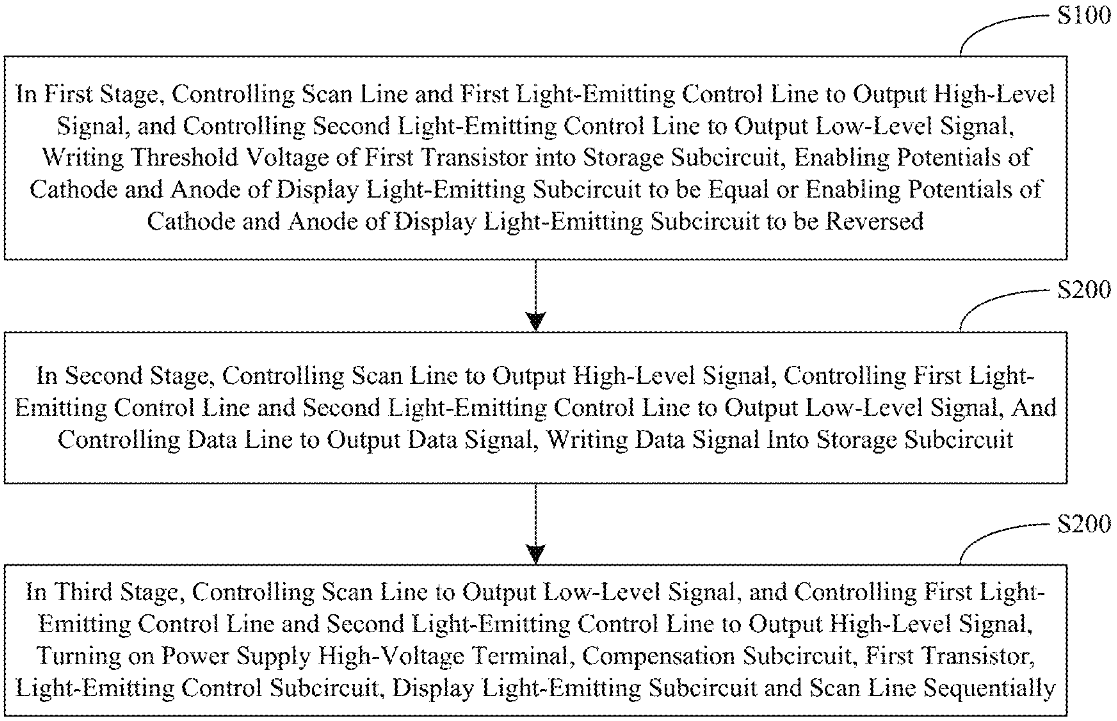
FIG. 3 is a flowchart of a display driving method in embodiment II of the present application.

This embodiment provides a display driving method, and the display driving method is used for driving the display driving circuit disclosed in the first embodiment. FIG. 3 is a flowchart of a display driving method in embodiment II of the present application. Referring to FIGS. 3, the display driving method includes:

- S100: in a first stage T1, controlling the scan line 310 and the first light-emitting control line 330 to output a high-level signal, and controlling the second light-emitting control line 340 to output a low-level signal, writing a threshold voltage of the first transistor 110 into the storage subcircuit 120, enabling potentials of cathode and anode of the display light-emitting subcircuit 200 to be equal or enabling potentials of cathode and anode of the display light-emitting subcircuit 200 to be reversed;
- S200: in a second stage T2, controlling the scan line 310 to output the high-level signal, controlling the first light-emitting control line 330 and the second light-emitting control line 340 to output the low-level signal, and controlling the data line 320 to output a data signal, writing the data signal into the storage subcircuit 120; and S300: in a third stage T3, controlling the scan line 310 to output the low-level signal, and controlling the first light-emitting control line 330 and the second light-emitting control line 340 to output the high-level signal, turning on the power supply high-voltage terminal 350, the compensation subcircuit 130, the first transistor 110, the light-emitting control subcircuit 160, the display light-emitting subcircuit 200 and the scan line 310 sequentially.

Figure 4:
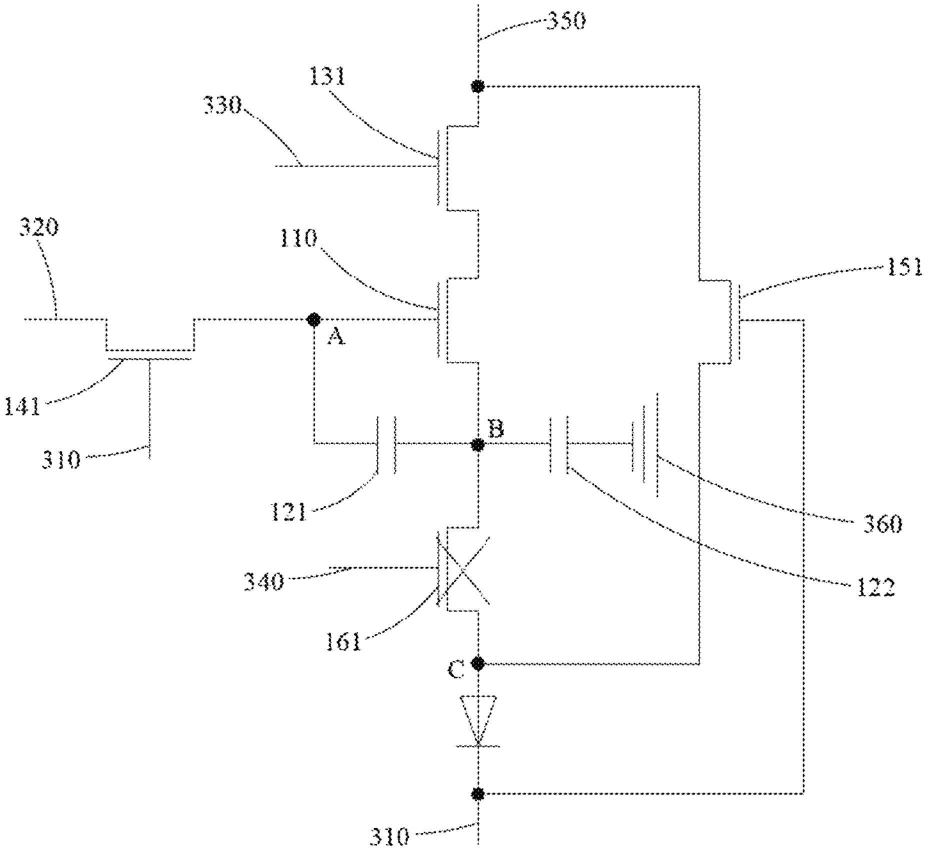
FIG. 4 is a schematic diagram of the display driving circuit in a first stage in embodiment II of the present application.

Specifically, FIG. 4 is a schematic diagram of the display driving circuit in the first stage in embodiment II of the present application, in which "x" indicates that the transistor is turned off. Referring to FIG. 4, in the first stage T1, the scan line 310 and the first light-emitting control line 330 are controlled to output a high-level signal, and the second light-emitting control line 340 is controlled to output a low-level signal, the second transistor 131, the third transistor 141, the fourth transistor 151 are turned on, and the fifth transistor 161 is turned off. At this time, the cathode of the display light-emitting subcircuit 200 changes from the low potential VgL of the scan signal at the time of light emitting in the previous frame to the high potential VgH, while the fourth transistor 151 is turned on so that the power supply high-voltage terminal 350 and the third node C are turned on, and the anode potential of the display light-emitting subcircuit 200 changes to the potential Vdd of the power supply high-voltage terminal 350, so that the anode potential Vdd of the display light-emitting subcircuit 200 is less than the cathode potential VgH of the display light-emitting subcircuit 200, to achieve the reverse biasing of the display light-emitting subcircuit 200.

Meanwhile, before the data voltage Vdata is written, the potential $V_A$ of the first node A is 0, and the first transistor 110 is not completely turned off. The voltage Vdd of the power supply high-voltage terminal 350 may be reduced to 0, thereby discharging through the power supply high-voltage terminal 350. When a source-drain voltage difference of the first transistor 110 is Vgs, where $Vgs=V_A-V_B$, and the potential $V_B$ of the second node B is equal to −Vth, Vgs=Vth, that is, when the second node B is discharged to −Vth, the first transistor 110 is completely turned off, and the threshold voltage Vth of the first transistor 110 is written into the first capacitor 121.

It should be noted that the threshold voltage Vth may be written into the first capacitor 121 by the second node B discharging to the power supply high-voltage terminal 350 after the voltage Vdd of the power supply high-voltage terminal 350 drops to 0, but it is not limited to this, the threshold voltage Vth may also be written into the first capacitor 121 by cutting off the data voltage Vdata to make the potential $V_A$ of the first node A be 0 at the end of the previous frame, as the case may be. At the end of the previous frame, the potential $V_B$ of the second node B is (Cs/(Cs+Cd))*Vdata−Vth, the data voltage Vdata is cut off so that the potential $V_A$ of the first node A is 0, and the first capacitor 121 can be discharged. When the first capacitor 121 is discharged to −Vth, the first transistor 110 is completely turned off, and the threshold voltage Vth of the first transistor 110 is written into the first capacitor 121.

Figure 5:
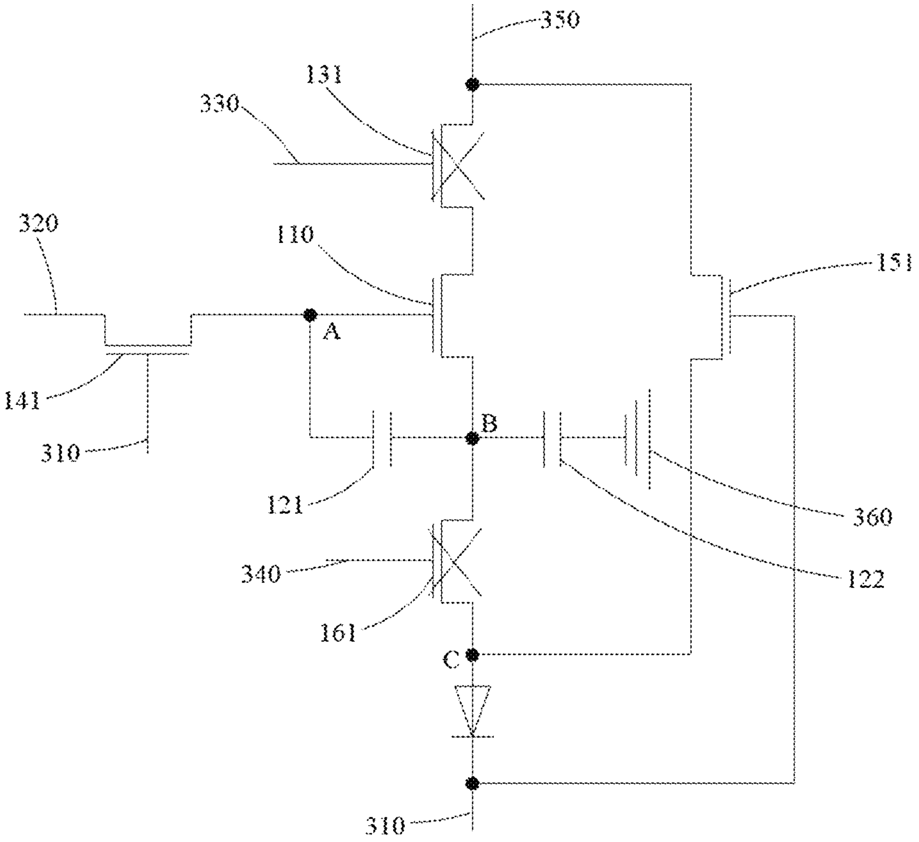
FIG. 5 is a schematic diagram of the display driving circuit in a second stage in embodiment II of the present application.

FIG. 5 is a schematic diagram of the display driving circuit in the second stage in embodiment II of the present application, in which "x" indicates that the transistor is turned off. Referring to FIG. 5, in the second stage T2, the scan line 310 is controlled to output a high-level signal, the first light-emitting control line 330 and the second light-emitting control line 340 are controlled to output a low-level signal, the third transistor 141 and the fourth transistor 151 are turned on, and the first transistor 110, the second transistor 131 and the fifth transistor 161 are turned off. The display light-emitting subcircuit 200 is still in a reverse biasing state. The control data line 320 outputs a data signal, the potential VA of the first node A changes from 0 to the data voltage Vdata, the potential VB of the second node B changes from −Vth to (Cs/(Cs+Cd))*Vdata−Vth according to the capacitive coupling effect, the data voltage Vdata is written into the storage subcircuit 120, and the first transistor 110 is turned on again.

Figure 6:
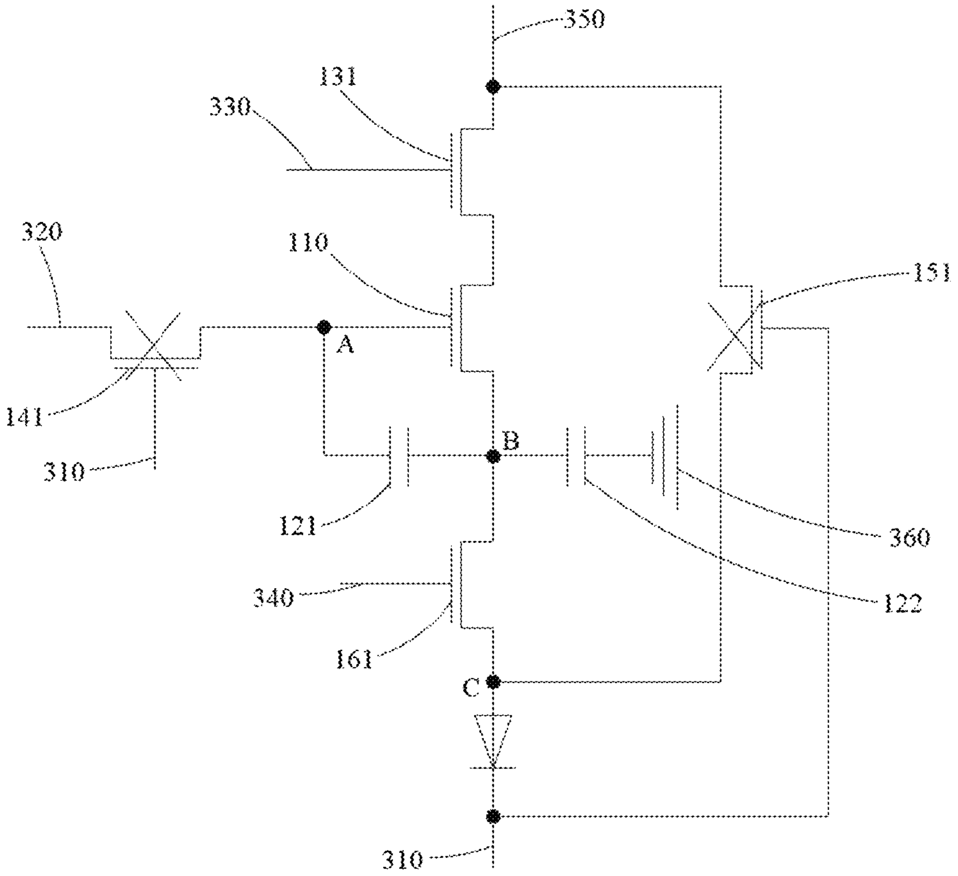
FIG. 6 is a schematic diagram of the display driving circuit in a third stage in embodiment II of the present application.

FIG. 6 is a schematic diagram of the display driving circuit in the third stage in embodiment II of the present application, in which "x" indicates that the transistor is turned off. Referring to FIG. 6, the scan line 310 is controlled to output a low-level signal, and the first light-emitting control line 330 and the second light-emitting control line 340 are controlled to output a high-level signal, the third transistor 141 and the fourth transistor 151 are turned off, and the second transistor 131 and the fifth transistor 161 are turned on. The cathode potential of the display light-emitting subcircuit 200 is switched to the low level VgL of the scan signal, that is the display light-emitting subcircuit 200 is switched to the forward bias state. The alternating current driving of the display light-emitting subcircuit 200 is realized by switching the high and low potentials of the scanning signal. The current flows from the power supply high-voltage terminal 350, passing through the compensation subcircuit 130, the first transistor 110, the light-emitting control subcircuit 160, and the display light-emitting subcircuit 200, to the scan line 310 to drive the display light-emitting subcircuit 200 to emit light.

In the first stage T1, the anode potential of the display light-emitting subcircuit 200 is changed into the potential Vdd of the power supply high-voltage terminal 350 to perform reverse biasing of the display light-emitting subcircuit 200, when the threshold voltage Vth of the first transistor 110 is written into the first capacitor 121; in the second stage T2, the data voltage Vdata is written into the storage subcircuit 120; and in the third stage T3, the fifth transistor 161 is turned on, the current flows from the power supply high-voltage terminal 350, passing through the compensation subcircuit 130, the first transistor 110, the light-emitting control subcircuit 160, and the display light-emitting subcircuit 200, to the scan line 310 to drive the display light-emitting subcircuit 200 to emit light. The reverse bias subcircuit 150 turns on the power supply high-voltage terminal 350 and the anode of the display light-emitting subcircuit 200 to change the anode potential of the display light-emitting subcircuit 200 to the potential Vdd of the power supply high-voltage terminal 350, to reverse bias the display light-emitting subcircuit 200, which eliminates the built-in electric field formed by the forward bias of the display light-emitting subcircuit 200 and further improves the luminous efficiency of the display light-emitting subcircuit 200.

Embodiment III

Figure 7:
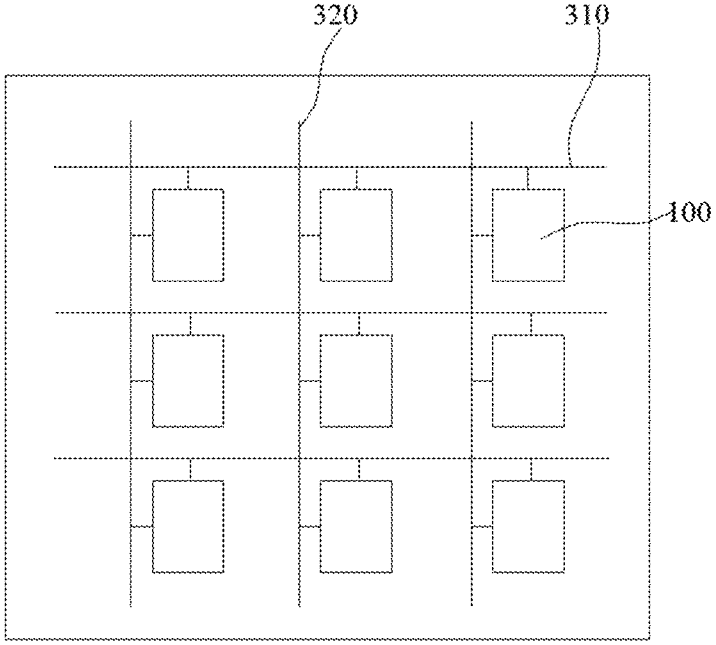
FIG. 7 is a schematic diagram of a display panel in embodiment III of the present application.

FIG. 7 is a schematic diagram of a display panel in embodiment III of the present application. Referring to FIG. 7, the display panel in this embodiment includes a display driving circuit 100 and a display light-emitting subcircuit 200, the display light-emitting subcircuit 200 is connected to the light-emitting control subcircuit 160 of the display driving circuit 100, and the display driving circuit 100 includes the display driving circuit 100 disclosed in the embodiment I.

The display panel includes the display driving circuit 100, the first terminal of the first transistor 110 in the display driving circuit 100 is connected to the anode of the display light-emitting subcircuit 200, the storage subcircuit 120 is connected to the control terminal of the first transistor 110 through the first node A, the storage subcircuit 120 is connected to the first terminal of the first transistor 110 through the second node B, the compensation subcircuit 130 is connected to the first light-emitting control line 330, the second terminal of the first transistor 110 and the power supply high-voltage terminal 350, the data writing subcircuit 140 is connected to the data line 320, the scan line 310 and the first node A, the light-emitting control subcircuit 160 is connected to the second light-emitting control line 340 and the second node B, and the light-emitting control subcircuit 160 is further connected to the anode of the display light-emitting subcircuit 200 through the third node C, a cathode of the display light-emitting subcircuit 200 is connected to the scan line 310, and the reverse bias subcircuit 150 is connected to the scan line 310, the third node C and the power supply high-voltage terminal 350. The reverse bias subcircuit 150 can turn on the power supply high-voltage terminal 350 and the anode of the display light-emitting subcircuit 200, and change the potential of the anode of the display light-emitting subcircuit 200 into the potential Vdd of the power supply high-voltage terminal 350, enable the potentials of the cathode and anode of the display light-emitting subcircuit 200 to be equal or enable the potentials of the cathode and anode of the display light-emitting subcircuit 200 to be inverted, that is, the built-in electric field formed by the forward bias of the display light-emitting subcircuit 200 is eliminated, and the luminous efficiency of the display light-emitting subcircuit 200 is improved.

The terms "first", "second", etc. are used for descriptive purposes only and cannot be understood to indicate or imply relative importance or imply the number of technical features indicated. Thus, features defined with "first", "second", etc. may explicitly or implicitly include one or more of such features. In the description of this application, "multiple" means two or more, unless expressly specified otherwise. Thus, features defined with "first", "second" and the like may explicitly or implicitly include one or more of the features. In the description of the present application, "multiple" means two or more unless otherwise expressly specified.

In the present application, unless otherwise explicitly provided and limited, the terms such as "mount," "connect," should be understood broadly, which, for example, may refer to a fixed connection, a detachable connection, or an integral connection; which may refer to a mechanical connection or an electrical connection; which may refer to a direct connection or an indirect connection via an intermediate medium; which may also refer to a communication between the insides of two elements. For those ordinarily skilled in the art, the specific meanings of the above terms in the present application will be understood according to the specific circumstances.

In the content of the description, illustrations of the reference terms "some embodiments," "example," etc. mean that specific features, structures, materials, or characteristics described in connection with the embodiment or example are encompassed in at least one embodiment or example of the present application. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may combine and incorporate different embodiments or examples described in the description and features of different embodiments or examples.

Although embodiments of the present application have been shown and described above, it will be understood that the above-mentioned embodiments are exemplary and cannot be construed as limiting the present application. Those of ordinary skill in the art may make changes, variations, alternatives and modifications to the above-mentioned embodiments within the scope of the present application. Therefore, any changes or modifications made in accordance with the claims and descriptions of the present application should fall within the scope of the patent of the present application.

What is claimed is:

1. A display driving circuit comprising a first transistor, the first transistor being connected to a display light-emitting subcircuit, wherein the display driving circuit further comprises:

a storage subcircuit connected to a control terminal of the first transistor through a first node and connected to a first terminal of the first transistor through a second node;

a compensation subcircuit connected to a first light-emitting control line, a second terminal of the first transistor and a power supply terminal;

a data writing subcircuit, comprising a third transistor, wherein a control terminal of the third transistor is connected to a scan line, a first terminal of the third transistor is connected to the first node, and a second terminal of the third transistor is connected to a data line, for writing a data line signal into the storage subcircuit in response to a first scan line signal, wherein a potential of the power supply terminal is less than a potential of the scan line when the scan line receives the first scan signal, and the potential of the power supply terminal is higher than the potential of the scan line when the scan line receives a second scan line signal, wherein the first scan line signal is higher than the second scan line signal in potential;

a light-emitting control subcircuit connected to a second light-emitting control line and the second node, the light-emitting control subcircuit further connected to an anode of the display light-emitting subcircuit through a third node, a cathode of the display light-emitting subcircuit being connected to the scan line, and an end of the third node is connected to the display light-emitting subcircuit, another end of the third node is connected to the light-emitting control subcircuit; and a reverse bias subcircuit, comprising a fourth transistor, wherein a control terminal of the fourth transistor is connected to the scan line connected to the cathode of the display light-emitting subcircuit, a first terminal of the fourth transistor is connected to the third node, and a second terminal of the fourth transistor is connected to the power supply terminal, the reverse bias subcircuit being configured for being conducted to enabling a potential of anode of the display light-emitting subcircuit to be equal to the potential of the power supply terminal in response to the first scan line signal, to make a potential of the cathode of the display light-emitting subcircuit greater than the potential of anode of the display light-emitting subcircuit.

2. The display driving circuit according to claim 1, wherein the storage subcircuit comprises a first capacitor, the first capacitor being connected to the first node and the second node.

3. The display driving circuit according to claim 2, wherein the storage subcircuit further comprises a second capacitor, the second capacitor being connected to the second node and a grounding terminal.

4. The display driving circuit according to claim 3, wherein the compensation subcircuit comprises a second transistor, wherein a control terminal of the second transistor is connected to the first light-emitting control line, a first terminal of the second transistor is connected to the first transistor, and a second terminal of the second transistor is connected to the power supply terminal.

5. The display driving circuit according to claim 3, wherein the light-emitting control subcircuit comprises a fifth transistor, wherein a control terminal of the fifth transistor is connected to the second light-emitting control line, a first terminal of the fifth transistor is connected to the third node, and a second terminal of the fifth transistor is connected to the second node.

6. The display driving circuit according to claim 3, wherein when data voltage is written to the first node, potential of the first node changes from 0 to Vdata, potential of the second node changes from −Vth to (Cs/(Cs+Cd))*Vdata−Vth, where Cs is a capacitance of the first capacitor, and Cd is the capacitance of the second capacitor.

7. The display driving circuit according to claim 6, wherein when the display light-emitting subcircuit emits light, current I flowing through the display light-emitting subcircuit is:

$$I = 1/2 * \mu * k\left(Cd/(Cs + Cd)\right) * Vdata\right)^2$$

where μ is a carrier mobility, k=W/L, W is a channel width of the first transistor, and L is a channel length of the first transistor.

8. A display panel comprising:
a display driving circuit; and
a display light-emitting subcircuit connected to the display driving circuit;
wherein the display driving circuit comprises a first transistor, the first transistor being connected to the display light-emitting subcircuit, wherein the display driving circuit further comprises:
a storage subcircuit connected to a control terminal of the first transistor through a first node and connected to a first terminal of the first transistor through a second node;
a compensation subcircuit connected to a first light-emitting control line, a second terminal of the first transistor and a power supply terminal;
a data writing subcircuit, comprising a third transistor, wherein a control terminal of the third transistor is connected to a scan line, a first terminal of the third transistor is connected to the first node, and a second terminal of the third transistor is connected to a data line, for writing a data line signal into the storage subcircuit in response to a first scan line signal, wherein a potential of the power supply terminal is less than a potential of the scan line when the scan line receives the first scan signal, and the potential of the power supply terminal is higher than the potential of the scan line when the scan line receives a second scan line signal, wherein the first scan line signal is higher than the second scan line signal in potential;
a light-emitting control subcircuit connected to a second light-emitting control line and the second node, the light-emitting control subcircuit further connected to an anode of the display light-emitting subcircuit through a third node, a cathode of the display light-emitting subcircuit being connected to the scan line, and an end of the third node is connected to the display light-emitting subcircuit, another end of the third node is connected to the light-emitting control subcircuit; and
a reverse bias subcircuit, comprising a fourth transistor, wherein a control terminal of the fourth transistor is connected to the scan line connected to the cathode of the display light-emitting subcircuit, a first terminal of the fourth transistor is connected to the third node, and a second terminal of the fourth transistor is connected to the power supply terminal, the reverse bias subcircuit being configured for being conducted to enabling a potential of anode of the display light-emitting subcircuit to be equal to the potential of the power supply terminal in response to the first scan line signal, to make a potential of the cathode of the display light-emitting subcircuit greater than the potential of anode of the display light-emitting subcircuit.

9. The display panel according to claim 8, wherein the storage subcircuit comprises a first capacitor, the first capacitor being connected to the first node and the second node.

10. The display panel according to claim 9, wherein the storage subcircuit further comprises a second capacitor, the second capacitor being connected to the second node and a grounding terminal.

11. The display panel according to claim 10, wherein the compensation subcircuit comprises a second transistor, wherein a control terminal of the second transistor is connected to the first light-emitting control line, a first terminal of the second transistor is connected to the first transistor, and a second terminal of the second transistor is connected to the power supply terminal.

12. The display panel according to claim 10, wherein the light-emitting control subcircuit comprises a fifth transistor, wherein a control terminal of the fifth transistor is connected to the second light-emitting control line, a first terminal of the fifth transistor is connected to the third node, and a second terminal of the fifth transistor is connected to the second node.

13. The display panel according to claim 10, wherein when data voltage is written to the first node, potential of the first node changes from 0 to Vdata, potential of the second node changes from −Vth to (Cs/(Cs+Cd))*Vdata−Vth, where Cs is a capacitance of the first capacitor, and Cd is the capacitance of the second capacitor.

* * * * *